Jan. 28, 1930.  H. A. DENMIRE  1,744,754
VULCANIZING HEATER AND METHOD OF HANDLING MOLDING DEVICES
Filed Nov. 16, 1927  6 Sheets-Sheet 1

Fig.1.

INVENTOR
Harold A. Denmire
BY Evans & McCoy
ATTORNEYS

Fig. 2.

Jan. 28, 1930.                H. A. DENMIRE                 1,744,754
          VULCANIZING HEATER AND METHOD OF HANDLING MOLDING DEVICES
                      Filed Nov. 16, 1927         6 Sheets-Sheet 6

INVENTOR
BY *Harold A Denmire*
*Evans & McCoy*
ATTORNEYS

Patented Jan. 28, 1930

1,744,754

UNITED STATES PATENT OFFICE

HAROLD A. DENMIRE, OF AKRON, OHIO

VULCANIZING HEATER AND METHOD OF HANDLING MOLDING DEVICES

Application filed November 16, 1927. Serial No. 233,597.

This invention relates to a method of and apparatus for discharging, recharging and operating vulcanizing equipment of the type in which the articles to be vulcanized are confined in a plurality of molds arranged in a pack and more particularly to a method of a means for selectively opening and closing the mold units of a pack of molds for discharging the vulcanized articles and replacing them with articles to be vulcanized.

Although the invention is of quite general application, it is of particular utility in connection with the vulcanizing of pneumatic tire casings, inner tubes, etc. and the embodiments herein illustrated are particularly designed for use in connection with vulcanizing apparatus for tire casings, inner tubes or other parts of pneumatic tires, although it will be obvious that the invention can be used for many other purposes.

The handling of tire molds in connection with the tire vulcanizing apparatus has heretofore been a laborious and time consuming process. Previous efforts to expedite the charging and discharging of heaters have involved cumbersome and expensive machinery generally including conveyors, hoists and the like, which not only occupy considerable floor space, but also are expensive to operate and require that a considerable number of heater units be operated simultaneously at full capacity in order to warrant installation of such equipment.

The present invention has for an object to provide a method of and apparatus for discharging and recharging the individual molds of a mold group in order that any one heater unit may be operated economically, independently of other heater units, and further, to provide a mold handling apparatus which can be installed and operated at low cost and which occupies a small amount of floor space.

A further object of the invention is to provide a mold handling apparatus by means of which successive molds are broken open at a point convenient to an operator or operators standing alongside the heater unit who are thus enabled to quickly remove the vulcanized articles from the molds and replace the same with unvulcanized articles.

A further object is to provide a mold pack in the form of a series of hingedly connected molds, each formed of complemental hinged sections so that the molds may be unfolded and opened and refolded into a pack.

A further object of the invention is to provide a single heater unit of the pot type in which the individual mold units remain associated with the pot heater during the charging and removal of articles from the mold unit and in which the selective handling of the mold units is controlled in part by the hydraulic piston for compressing the molds during the vulcanizing process.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Referring first to Figs. 1 to 6 of the drawing in which the invention is shown as applied to a vulcanizing heater of the pot type; the heating chamber 1, which is of the usual cylindrical form, extends below the floor level. Extending downwardly beneath the bottom of the heating chamber, there is a fluid pressure cylinder 2 which has a piston 3 to the upper end of which is attached a head 4 which serves as a support for a series of superposed molds in the heating chamber. Above the upper end of the heating chamber 1, there is a cylindrical housing 5 which extends upwardly to a considerable distance above the top of the heating chamber for a purpose which will be hereinafter described. Hydraulic or other fluid pressure is admitted to or exhausted from the lower end of the cylinder 2 to raise or lower the piston 3 through a suitable pipe 6, which is connected to a pressure supply pipe 7 through a suitable control valve 8. The heating chamber 1 is provided with a cover 9 which is adapted to seal the upper end of the heating chamber and this cover is provided with a locking flange 10 having wedge lugs 10ᵃ which engage with wedge lugs 11 projecting inwardly from the wall of the chamber 1 at its upper edge. Steam is admitted to the chamber 1 to supply the heat for vulcanization through a steam pipe 12 controlled by a valve 13 and water of condensation is drained from the bottom of the chamber through a drain pipe 14.

Figure 1:
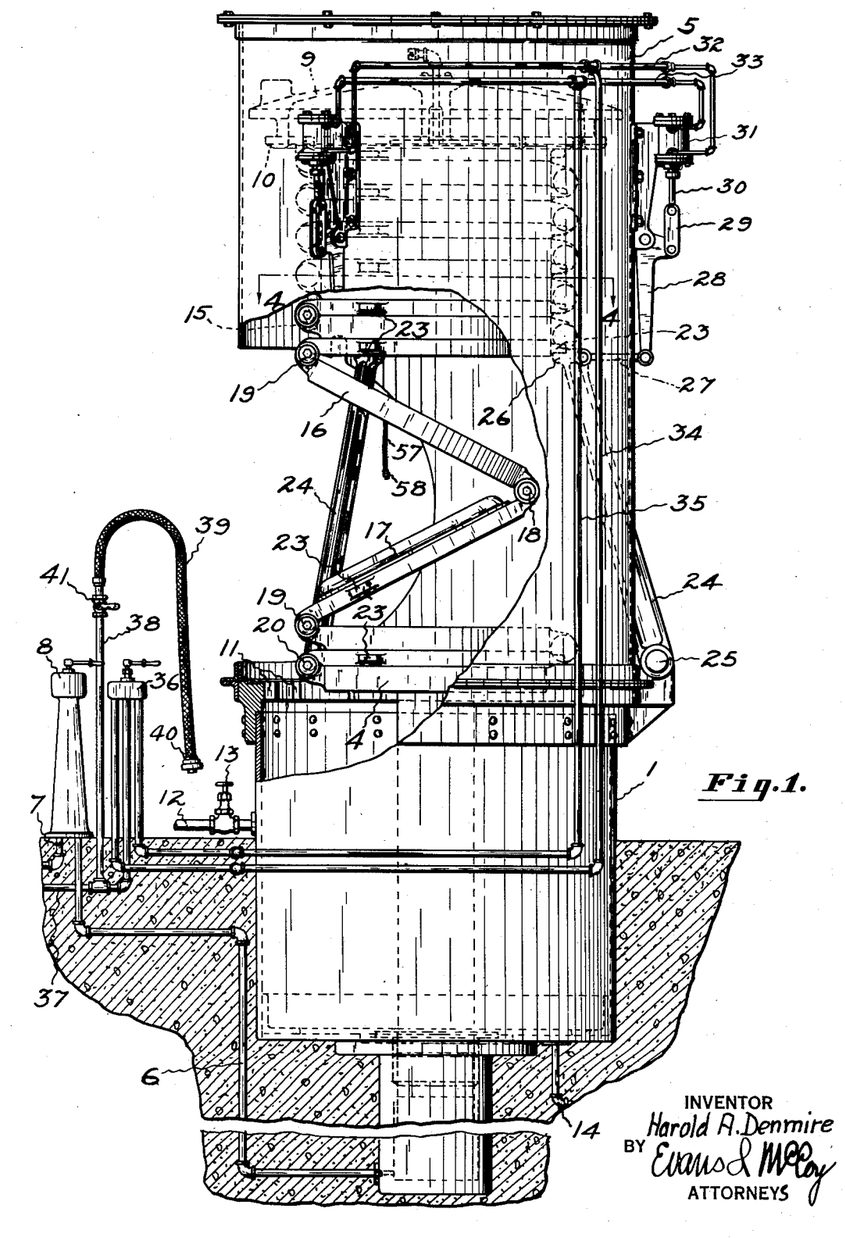
Figure 1 is a side elevation of apparatus embodying the invention as applied to vulcanizing heaters of the pot type, a portion of the casing being broken away in this figure to more clearly show the molds within the casing.
Figure 2:
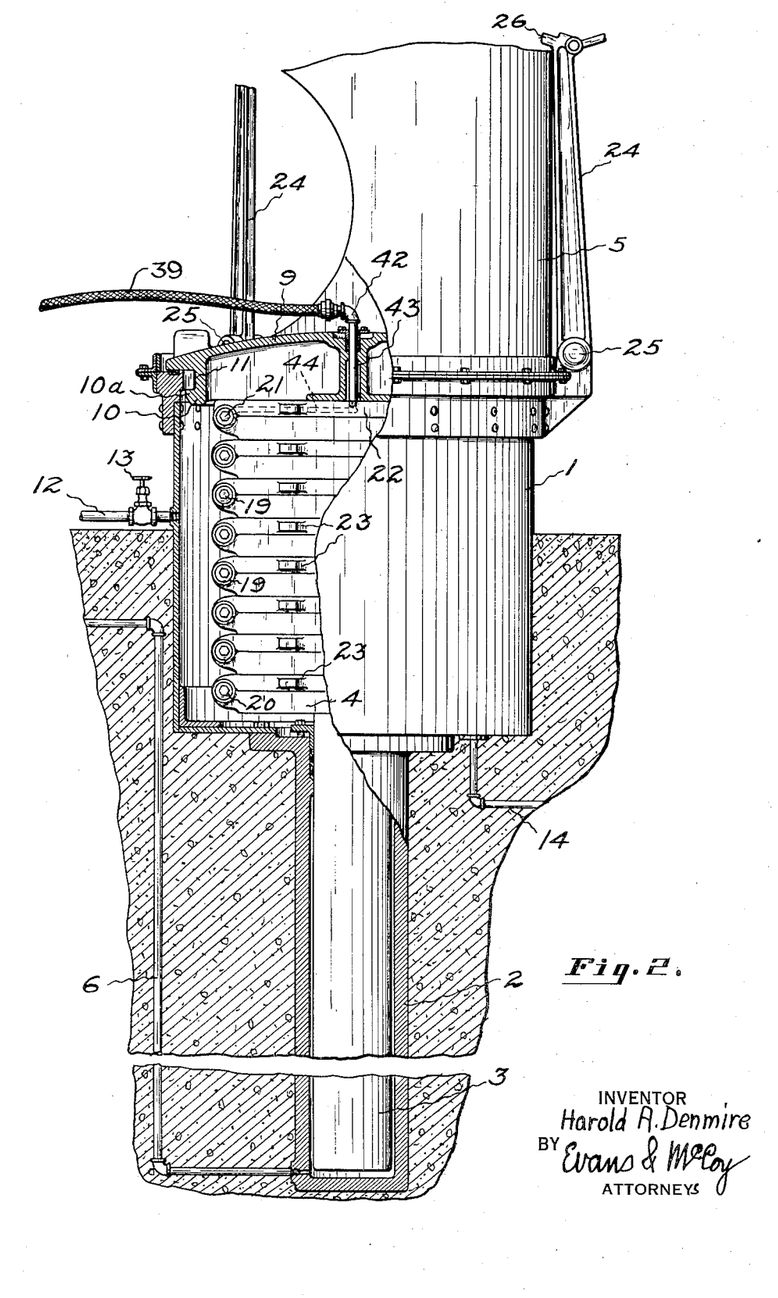
Fig. 2 is a fragmentary side elevation of the heater shown in Fig. 1 showing the mold pack within the heating chamber.

A series of annular tire molds 15 are supported upon the head 4 and each of these tire molds consists of complemental upper and lower sections 16 and 17 which are formed with annular cavities which fit upon a tire casing in the mold. Each upper mold section is connected to its complemental lower section by a hinge 19 and to the lower section of a superposed mold by a hinge 18, the hinges 19 being disposed one above the other at one side of the pile of molds and hinges 18 being disposed diametrically opposite the hinges 19. The bottom section of the lowermost mold is connected to the head 4 of the supporting piston by a hinge 20 and the upper section of the topmost mold is connected by a hinge 21 to a pressure plate 22 attached to the underside of the cover 9.

The lower section of each mold has a suitable number of circumferentially spaced outwardly projecting lugs 23 which are engaged by latch members 24 as shown in Fig. 1 to support any number of the molds in the upper portion of the housing 5. The latches 24, as herein shown, are in the form of bars connected at their lower ends by pivots 25 to the top portion of the heating chamber 1 and having inwardly projecting lug engaging shoulders 26 at their upper free ends. Means is provided for yieldably holding the bars 24 in positions in which the shoulders 26 are in the path of the lugs 23 so that when a mold is lifted above the shoulders 26, the shoulders 26 will be forced outwardly by the lugs which will be automatically engaged by the shoulders 26 to retain the mold in its raised position as soon as the lugs have passed the shoulders 26. For simultaneously operating the latches, each latch bar 24 has connected to its upper end an outwardly extending link 27, which is connected to one arm of the bell crank 28 pivoted on the housing. The other arm of each of the bell cranks is connected through a link 29 with a piston rod 30 extending from a fluid pressure cylinder 31 to which are connected pipes 32 and 33 for supplying pressure above and below the piston in the cylinder. Pipes 32 and 33 are connected by pipes 34 and 35 through a suitable control valve 36 to an air pressure line 37.

When pressure is admitted to the upper ends of the cylinders 31, the latch arms 24 are pressed inwardly to a position in which the shoulders 26 are in a path of movement of the lugs 23 on the molds. When the molds are raised by means of the piston 3, the lugs 23 are successively forced past the latch shoulders 26 which immediately spring back beneath each lug after it has been forced past them.

The air pressure line 37 has connected thereto a branch pipe 38 which projects above the top of the heating chamber 1 and has attached thereto a short length of hose 39 which carries a quick detachable coupling member 40 at its free end. The coupling 40 is adapted to be connected with the fitting 42 at the upper end of a pipe 43, which extends downwardly through the center of the cover 9 to the pressure plate 22 where it communicates with a cored passage 44 in the plate 22 which leads radially from the center of the plate to the hinge 21 connecting the plate to the upper section of the topmost mold. The air connection through the hose 39 as above described is for the purpose of supplying air to the interior of each of the molds of the pack and in order to carry the air from one mold to the next, the hinge connections between the successive mold sections are so constructed as to permit passage of air from one mold section to the next adjacent section.

Figures 3, 4, 5, 6:
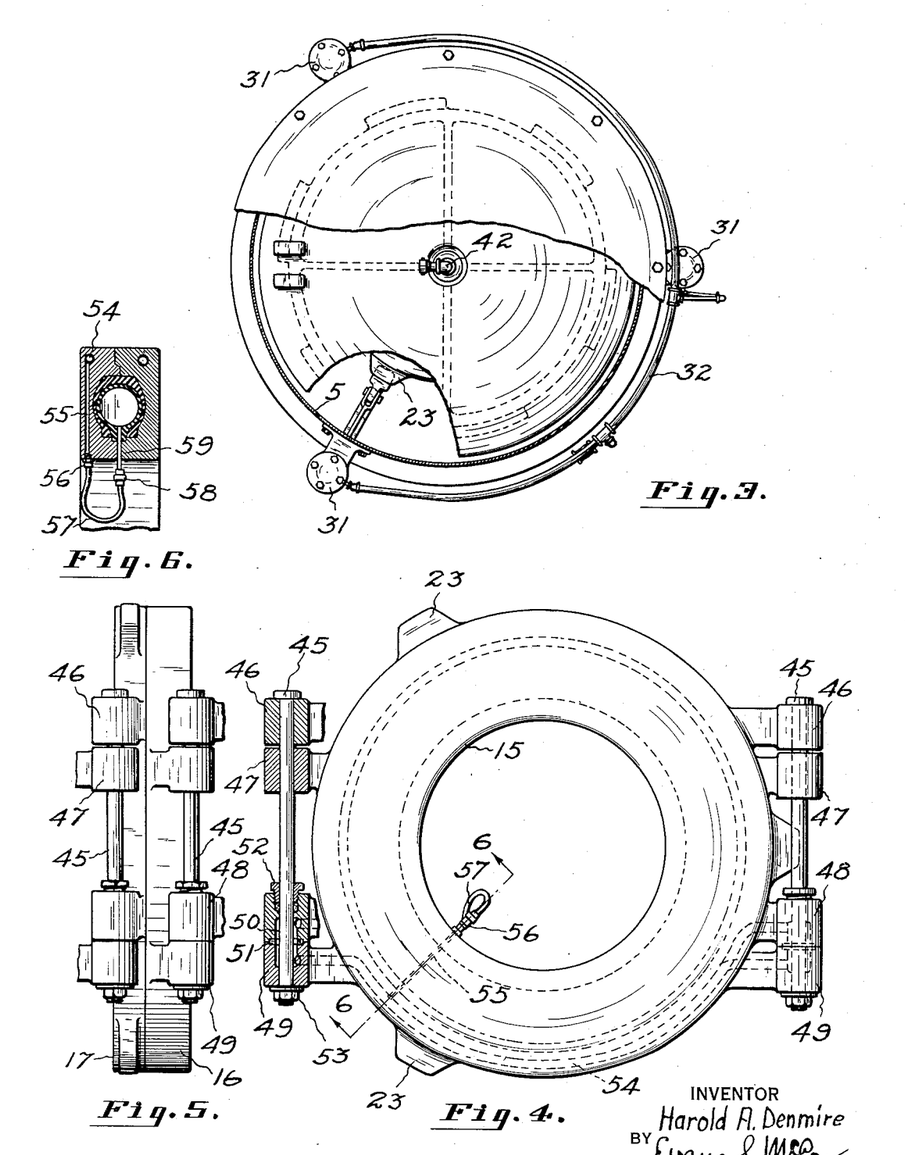
Fig. 3 is a plan view of the apparatus shown in Fig. 1 with a portion of the casing and cover broken away to show details of construction.
Fig. 4 is a plan view of the mold pack with a hinged connection between mold sections shown in section.
Fig. 5 is an end elevation of a mold.
Fig. 6 is a sectional detail view showing the connections for supplying air to the interior of a mold.

Referring particularly to Fig. 4 of the drawing, each of the hinges has a pintle 45 which extends through four lugs or knuckles formed integrally with the two adjacent mold sections, two of the lugs being integral with one mold section and the other two being integral with the other mold section, two of the lugs 46 and 47, one integral with one mold section and the other integral with the adjacent mold section are adjacent one end of the pintle and another pair of lugs, 48 and 49, are adjacent the opposite ends of the pintle. The lugs 48 and 49 have contiguous inner faces and are counter bored to provide a chamber 50 surrounding the pintle. A packing ring 51 is provided in the joints between the two lugs and a gland 52 provides a fluid tight joint with the pintle 45 at the inner end of the chamber 50, two lugs being pressed into engagement with each other by means of a nut 53 on the pintle 45.

All of the hinges are identical in construction and each mold section has a cored passage 54 which extends along the periphery of the mold section from the hinge on one side to the hinge on the other and through the integral lugs to the chambers 50 of the hinges. Air entering through the passage 44 in the pressure plate 22 passes through the hinge 21 to the uppermost mold section and alternately through the hinges 18 and 19 and passages 54 through all of the mold sections. One section of each mold has a passage 55 communicating with the passage 54 and extending inwardly therefrom to a fitting 56 to which is attached a short hose 57 which carries a quick detachable coupling 58 by which the hose 57 may be connected to the stem of an air bag in a tire casing within the mold.

Assuming that the molds are all empty and it is desired to charge them with unvulcanized tire casings, the piston 3 will be raised to lift the entire pack of molds into the upper portion of the housing 5 and the latch members 24 will be engaged with the lug 23 of the mold next above the lowermost mold. The piston 3 will then be lowered to the position shown in Fig. 1 and the lowermost mold will be broken open by reason of the fact that all of the molds except the lowermost are retained in the pack in the upper end of the chamber 5. The front side of the housing 5 is open so that an operator can readily place an unvulcanized tire casing on the lower section of the open mold. After the unvulcanized tire has been put in place, the coupling 58 is attached to the stem 7 of the air bag and the piston 3 is raised to close the mold against the bottom of the pack supported on the latch arms 24. The piston 3 is then lowered and at the same time, the control valve 36 is operated to momentarily withdraw the latch members 24 to release the next to the lowermost mold and to return the latch members into engaging position in time to engage the lugs 23 of the third mold from the bottom. As the piston is being returned to a position in which the head 4 is adjacent the top of the heating chamber, the second mold is broken open to receive a tire casing.

The above described operations are repeated until all of the molds have been charged, whereupon the latches are moved to disengaging position and the pack of molds, together with the cover are moved to their lowermost position with the pack of molds within the heating chamber and the cover in engagement with the top of the heating chamber. The cover is then turned to engage the wedge lugs 10$^a$ and 11 to seal the heating chamber, hydraulic pressure is applied to the molds by piston 3, the air line 39 is connected to inflate the air bags, and is admitted to the chamber through valve 13 to vulcanize the tire casings.

After the tires have been vulcanized, the steam is turned off, water is tured into the mold chamber to cool the molds, the air line 39 is disconnected to deflate the tire casings and the cover 9 is turned to release it from the casing 1. The piston 3 is elevated by fluid pressure until the lug 23 on the plate 22 on the cover is brought to a position above the shoulders 26.

The piston is then gradually lowered, causing the uppermost mold to open and, when the mold is partially opened, the coupling 58 is detached from the air bag so that when the head 4 reaches a position adjacent the top of the casing the cured tire can be removed from the mold and replaced with an uncured tire. As soon as this is done, the piston 3 is again raised until the uppermost mold is again closed and has been lifted to a point where its lugs 23 are above the supporting shoulders 26 of the latches. The piston 3 is then lowered to open the second mold from the top which is discharged and recharged in the same manner as the first mold. In some instances, it may be desirable to use a pinch bar to initially break the mold open. This operation is repeated until all of the molds have been discharged and recharged at which time the molds will all be in a pack supported in the upper part of the housing 5. The latch members are then withdrawn and the stack of molds charged with uncured tires is lowered into the heating chamber and the operation is repeated.

Figs. 7 to 12 of the drawing show the invention applied to a horizontally disposed heater unit in which the molds are opened and closed by shifting them horizontally instead of vertically.

Figure 7:
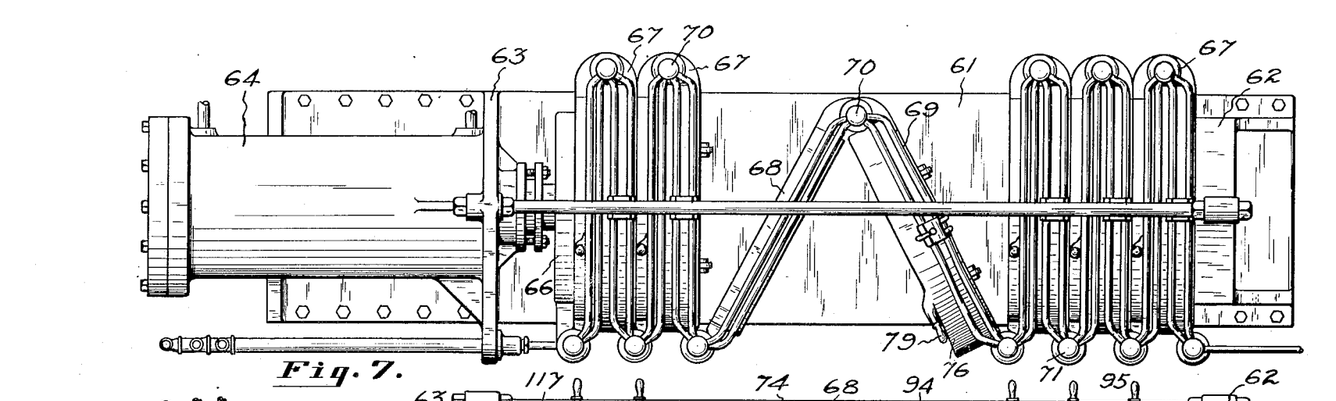
Fig. 7 is a plan view of apparatus embodying the invention as applied to a vulcanizing heater unit composed of heater units of the watch case type.
Figure 8:
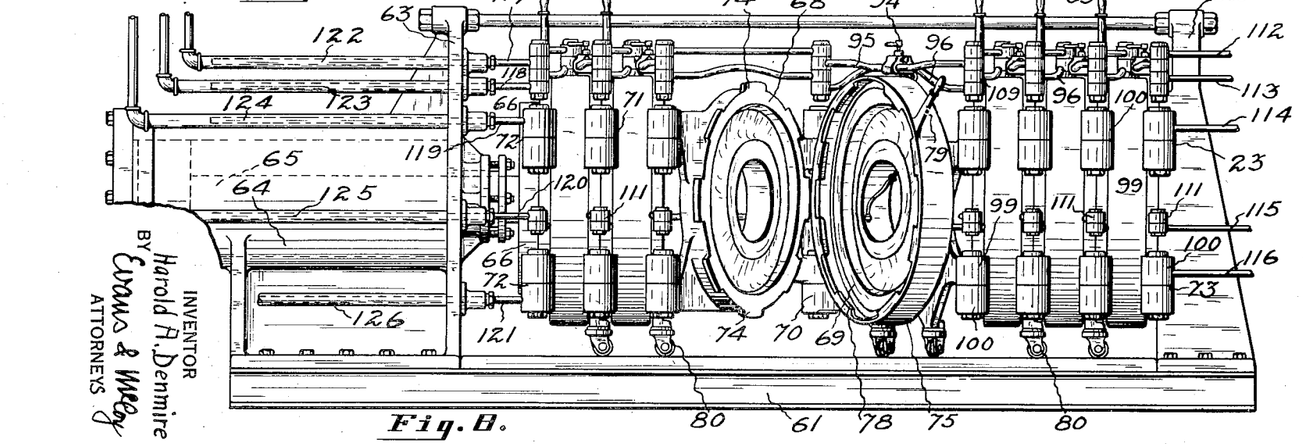
Fig. 8 is a side elevation of the apparatus shown in Fig. 7.

In this modification, the apparatus is supported on a frame consisting of a horizontal supporting base of platform 61 having fixed standards 62 and 63 at opposite ends thereof. Mounted on the standard 63, there is a horizontally disposed fluid pressure cylinder 64 from which projects a piston rod 65 carrying a head 66 which is movable toward and away from the standard 62. A series of molds 67 are mounted between the head 66 and the standard 62 and each of these molds consists of complemental sections 68 and 69 which are connected by hinges 70. The adjacent molds are connected by hinges 71 diametrically opposite the hinges 70 so that a mold may be opened upon movement of the head 66 with respect to the standard 62. The mold at one end of the pack supported on the platform 61 between the head 66 and the standard 62 is connected by a hinge 72 to the head 66 and the mold at the opposite end of the pack is connected by a hinge 73 to the standard 62.

The section 68 of each mold has wedge lugs 74 projecting laterally therefrom at spaced points along the periphery and the section 69 of each mold carries a locking ring 75 which has an inner flange 76 which fits in a peripheral groove on the mold section 69. The ring 75 surrounds the mold section 69 and projects inwardly past the inner face of the section and has inwardly projecting wedge lugs 78, which are adapted, in one position of the ring, to enter between the lugs 74 of the section 68 and, when the ring 75 is rotated on the mold section 69, to come into wedging engagement with the lugs 74, to tightly clamp the mold sections together, the ring 75 being provided with a handle 79 by which it may be turned into locking engagement with the lugs 74 or into a position to release one mold section from the other. The head 66 is movable from the position shown in Fig. 7 to a position in which the mold pack is clamped between the head 66 and the standard 62. The molds are provided with caster wheels 80 so that they are readily movable along the platform 61 and if one of the molds has its ring 75 moved to a position where the lugs 78 of the ring are disengaged from the lug 74 of the section 68 of the mold, this mold will be broken open when the head 66 is drawn toward the cylinder 64 so that an operator alongside the platform may remove a cured tire from the mold and insert an unvulcanized tire in the mold. Operation of the hydraulic cylinder may be suitably interlocked with the clamping rings 75 by suitable electrical contact elements to prevent operation of the piston except when one of the locking rings is released.

Figures 9, 10, 11, 12:
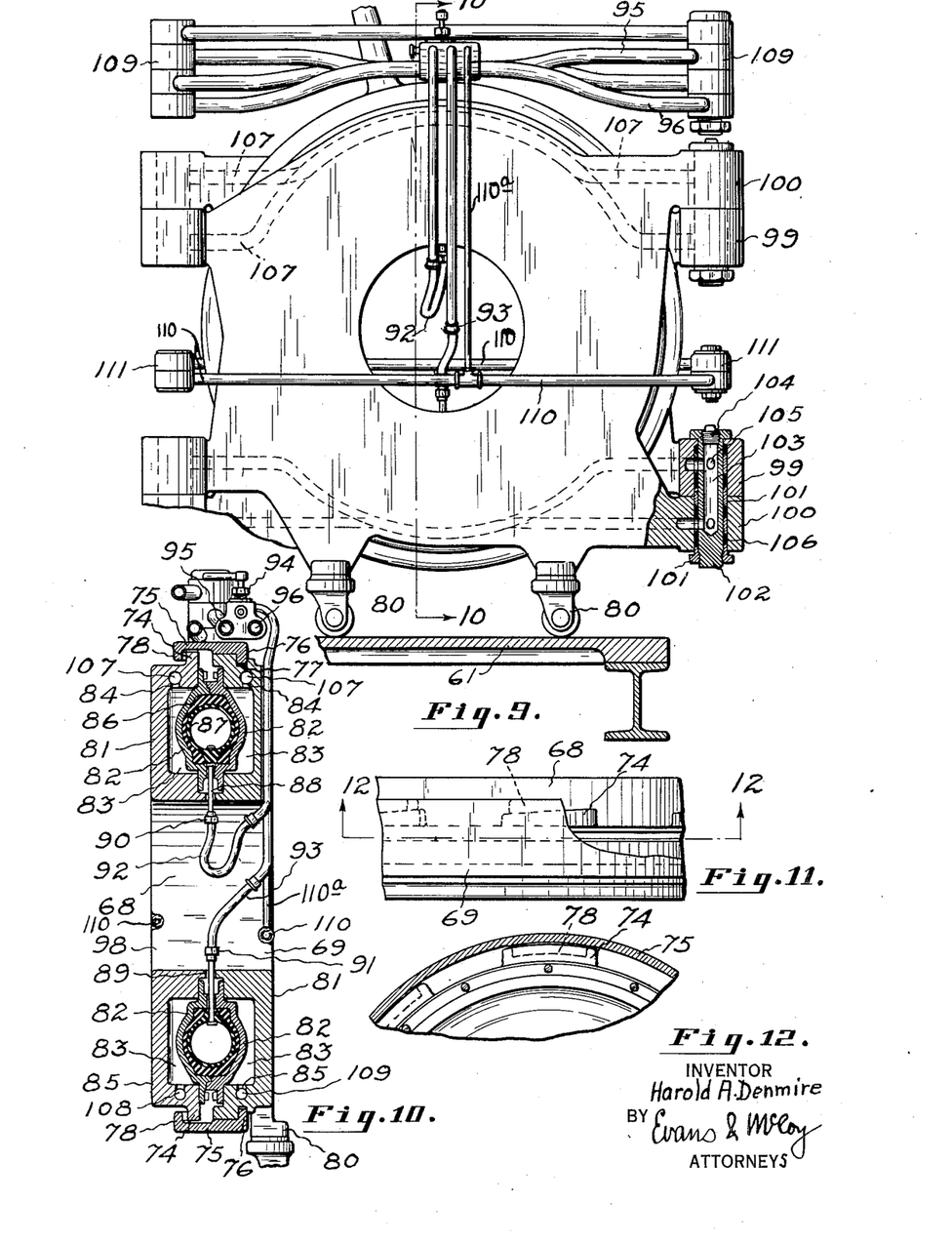
Fig. 9 is a side elevation of a mold with one of the hinged connections shown in section.
Fig. 10 is a section taken on the line indicated at 10—10 in Fig. 9.
Fig. 11 is a detail view showing the wedge lugs on one mold section and on the locking ring carried on the other mold section.
Fig. 12 is a section taken on the line indicated at 12—12 in Fig. 11.

As best shown in Fig. 10 of the drawing, each mold section has an annular channel shaped body portion 81, the channels of section of a mold facing toward each other. Secured upon the inner sides of each of the sections and extending across the channel, there is a concave metal plate 82 forming one half of the tire receiving recess and also forming the inner wall of an annular steam jacket 83. When the two mold sections are screwed together, the plates 82 of the mold sections are clamped together and form between them the annular recesses in which the tire is held during the vulcanizing process. Each of the steam jackets 83 has a steam inlet port 84 adjacent the top of the mold and a drain port 85 adjacent the bottom of the mold. A tire casing 86 within the mold is preferably provided upon the interior thereof with an air bag 87 which has a single valve stem if air is used as an inflating medium or, in the preferred form, has valve stems 88 and 89 projecting through the wall of the mold into the center opening thereof for circulating hot water through the air bag under vulcanizing pressure. The valve stems 88 and 89 are adapted to receive coupling members 90 and 91 carried by flexible tubes 92 and 93, which lead through a suitable control valve 94 to inlet and drain pipes 95 and 96.

During the vulcanizing process, hot water or other fluid under inflating pressure is supplied to the air bags through the hose 93, and drained therefrom by hose 94. Prior to the removal of the vulcanized casing from the mold, the supply of hot water is interrupted and cooling water is circulated through the air bag through the flexible tubes 92 and 93, to chill the vulcanized tire casing before it is removed from the mold. The control valve 94 is then turned to admit air under pressure from pipe 110 and 110ª to lead 92. This removes water from the air bag. The inflating pressure in the air bag is then released by turning valve 94.

Each of the hinges of the mold sections consists of two pairs of lugs 90 and 100 integral with the connected mold sections, each pair being joined by a pintle composed of an outer packing sleeve 101 and a pin 102 within the sleeve, the upper and lower pintles of the hinge being in axial alignment. Each pin 102 has bore 103 extending from one end, the open end of the bore being closed by a plug 104 to provide a chamber within the pintle. Ports 105 open laterally from the bore 103 of the pin into passages in the lugs 99 and 100. Cored passages 107 in the upper portion of each mold section lead from the ports 105 and 106 of the upper pintle of each hinge and these passages communicate with the steam inlet ports 84 of the steam jackets. Cored passages 108 formed in the lower portion of each mold section communicate with the ports 105 and 106 of the lower pintles and these passages communicate with the drain ports 85 of the steam jackets. The pipes 95 and 96 carried by each mold section are joined to the corresponding pipes of adjacent mold sections through the hinge couplings 109, which are positioned in axial alignment with the pintles of the hinges connecting the sections. Each mold section carries a transversely extending pipe 110 and lead pipes 110$^a$ through which air is supplied to the valve 94 and by it to the short lengths of hose 92 through which the air is supplied to the air bag. The air pipes 110 of adjacent sections are connected by hinge couplings 111 which are also in axial alignment with the hinges connecting the mold sections. A hot water inlet pipe 112 and a water outlet pipe 113 are connected to the hinge coupling 109 which is aligned with the hinge connecting the endmost mold section to the standard 62. A steam outlet pipe 114 is connected to the upper lug 100 integral with the standard 62 and forming a part of the hinge connection between the endmost mold section and the standard 62. An air inlet 115 is connected through the endmost hinge 111 with the air pipes on the mold sections and a drain pipe 116 is connected to the lower lug 100 of the hinge connecting the endmost mold section to the standard 62. Means is preferably provided for admitting water, steam or air and for draining the water from either end of the pack of molds and connections corresponding to the connections with the pipes 112, 113, 114, 115, and 116 are made with water inlet and outlet pipes 117 and 118, a steam inlet pipe 119 and air inlet pipe 120 and a drain pipe 121 at the hinge between the end mold section and movable head 66. The pipes 117, 118, 119, 120 and 121 move with the head 66 and have telescopic connection with pipes 122, 123, 124, 125 and 126, which are secured to the standard 63 so that connection is maintained between the pipes 117, 118, 119, 120, 121 and the pipes 122 and 123, 124, 125 and 126, regardless of the position of the head 66.

In the operation of the vulcanizing apparatus, assuming that the molds are all empty and that it is desired to charge the same with uncured tires, the locking ring 75 of one of the end molds is moved to releasing position and the head 66 is drawn back toward the cylinder 65, breaking open this mold. An unvulcanized tire casing with an air bag therein is then placed in the section of the mold to which the air hose 97 is attached and the air hose is coupled to one of the valve stems of the air bag. The head 66 is then moved by means of the cylinder 64 toward the standard 62 to swing the mold to a closed position, whereupon the ring 75 is moved to a locking position. Steam is maintained in the steam jackets 83 of the molds. The locking ring 75 of the next adjacent mold is then moved to releasing position and the head 66 again moved to open the second mold which is charged and closed in the same manner as the first mold. This operation is repeated until the desired number of molds have been charged. After sufficient time has elapsed for the vulcanization of the tire casing in the first mold, the water lines 92 and 93 are connected to the valve stems 88 and 89 of the air bag and the valve 94 is turned to circulate cooling water through the air bag. As soon as the casing is sufficiently cool, the water supply is cut off, air is admitted to drive the cooling water out of the air bag and out of discharge port 97. Pressure on the air bag is then released, the ring 75 of the mold is moved to releasing position and the mold is broken open by shifting the movable head 66. The cured tire is then removed from the mold and replaced with an uncured tire. The mold will then be again closed and locked in closed position and the second mold opened, this procedure being repeated until all of the molds have been emptied and recharged.

Figure 13:
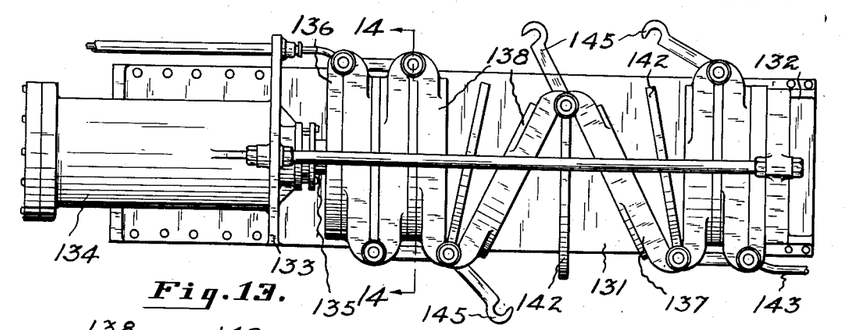
Fig. 13 is a plan view of apparatus embodying the invention as applied to a vulcanizing heater unit for vulcanizing bead rings.
Figures 14, 15, 16:
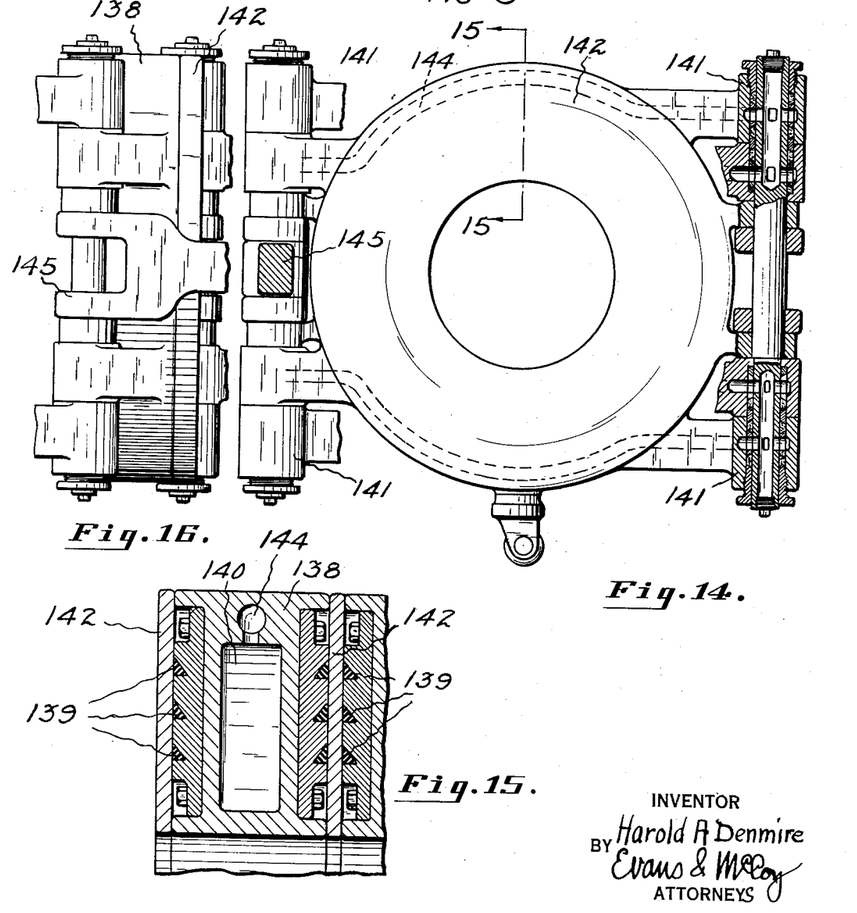
Fig. 14 is a side elevation of one of the molds shown in Fig. 13.
Fig. 15 is a section taken on the line indicated at 15—15 in Fig. 14.
Fig. 16 is an end elevation of the mold shown in Fig. 14.

Figs. 13, 14 and 15 of the drawing show the invention applied to apparatus for vulcanizing bead rings for pneumatic tire casings and in this modification, the molds are supported upon a frame having a horizontal base or platform 131 and fixed standards 132 and 133 at opposite ends of the platform. The standard 133 carries a fluid pressure cylinder 134 from which extends a piston rod 135 provided with a head 136. The molds 137 are supported in a manner similar to the molds in the modification shown in Figs. 7 to 12, the molds, however, are constructed to receive bead rings instead of tire casings.

Each mold consists of an annular mold frame 138 having annular mold plates 138$^a$ removably secured thereto. Each mold plate has ring receiving channels 139 in the side face thereof. The annular mold frames are each hollow to provide an annular steam chamber 140. The molds 137 are connected by hinges 141, successive hinges being diametrically opposite each other and each hinge preferably carries a division plate 142 which closes the ring receiving channels of the molds on opposite sides thereof. Steam is admitted to the steam chambers 140 through an inlet pipe 143 and steam is carried from the chamber of one mold to the chamber of the next adjacent mold through cored passages 144 communicating through the hinges of the molds as in the modification above described.

If a large group of molds are employed, suitable mold locks 145 may be used in lieu of the locking rings 75 shown and described in connection with Fig. 7 and Fig. 8 of the drawings. The locks 145 releasably connect each mold with the adjacent molds. The locks 145 may either be positioned on only one side of the mold group or they may be mounted on each side as shown. The locks are released for the molds that are to be opened and the molds are opened and closed by the moving piston head 136 substantially as in the modification shown in Fig. 7 to Fig. 12. If, however, the entire group of molds are intended to be simultaneously opened, then the locks 145 may be dispensed with.

The heater previously described is operated in substantially the same manner as the heater shown in Fig. 7 of the drawings except that an operator is stationed on each side of the unit for removing vulcanized heads and replacing them with unvulcanized heads.

The utility of the mold heaters herein described will be apparent to those skilled in the art. The heaters are inexpensive to construct, they can be operated by a minimum number of attendants with greatly increased production rate and are otherwise superior to heaters heretofore proposed.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The method of discharging and recharging vulcanizing heaters of the type in which the articles to be vulcanized are contained in a pack of molds within the heater, which comprises transferring the molds successively from the pack within the heater to a similar pack outside the heater, opening, discharging, recharging and closing each mold in the course of its transfer from the pack in the heater to the pack outside the heater, and transferring the pack of recharged molds bodily into the heater.

2. The herein described method of discharging and recharging vulcanizing heaters of the type in which the articles to be vulcanized are contained in a pack of molds within the heater, which comprises transferring the molds successively from the pack within the heater to a similar pack outside the heater, maintaining the two packs in alignment, opening, discharging, recharging and closing each mold in the course of its transfer from the pack in the heater to the pack outside the heater, and transferring the pack of recharged molds bodily into the heater.

3. In vulcanizing apparatus of the character described, a series of molds hingedly connected to fold into a pack, each mold consisting of hinged sections, the hinges connecting successive molds being diametrically opposite the hinges connecting the mold sections.

4. Vulcanizing apparatus comprising a series of molds hinged together to fold into a pack, means for supporting said molds, and means for shifting said molds one at a time, opening the molds and refolding the same in a separate pack.

5. Vulcanizing apparatus comprising a series of molds hinged together to fold into a pack, relatively movable members connected to endmost molds of said pack, and means for shifting one of said members away from the other to separate a mold from the pack whereby the molds may be successively shifted from the pack, refolded in a pack adjacent the shifted member and opened between the two packs.

6. Vulcanizing apparatus comprising a series of molds hinged together and each composed of hinged sections, a member connected to an endmost mold of the pack, and means including a fluid pressure operated piston connected to the mold at the opposite end of the pack for shifting the molds one at time, opening the same and refolding the molds in a separate pack.

7. Vulcanizing apparatus comprising a series of molds hinged together and each composed of hinged sections, a member connected to an endmost mold of the pack, a reciprocating member adapted to move the pack bodily, and means for holding a pack of molds against one of said members and for successively separating molds from the pack and opening the same as said member is reciprocated.

8. Vulcanizing apparatus comprising a heating chamber adapted to receive a pack of molds, means spaced from the chamber for supporting a pack of molds, and means for transferring molds one at a time from the chamber to said supporting means, for opening the molds between the chamber and supporting means for transferring the pack bodily from said supporting means into said chamber.

9. Vulcanizing apparatus comprising a heating chamber, a series of molds hinged together to fold into a pack within said chamber, and means for moving the molds out of the chamber, successively opening the same, refolding the molds in a pack spaced from the chamber and transferring the pack into the chamber.

10. Vulcanizing apparatus comprising a heating chamber, a series of molds hinged together to fold into a pack within said chamber, means for moving the molds out of the chamber, successively opening the same, refolding the molds in a pack spaced from the chamber and transferring the pack into the chamber, and means for establishing a fluid pressure connection to the interior of each mold.

11. Vulcanizing apparatus comprising a heating chamber having an open end, a member in the chamber movable toward and from the open end thereof, a detachable closure member for closing the open end of the chamber, and a series of molds connected to said movable member, said molds being hinged together and each formed of hinged sections.

12. Vulcanizing apparatus comprising a heating chamber having an open end, a member in the chamber movable toward and from the open end thereof, a detachable closure member for closing the open end of the chamber, and a series of hingedly connected molds adapted to be folded into a pack, each mold being composed of complemental hingedly connected sections and endmost molds of said series being connected to said movable member and closure member.

13. Vulcanizing apparatus comprising a heating chamber having an open end, a member in the chamber movable toward and from the open end thereof, a detachable closure member for closing the open end of the chamber, and a series of molds hingedly connected together and to said movable member and cover, each mold being composed of complemental hingedly connected half sections, the hinges between molds being parallel and diametrically opposite the hinges between mold sections.

14. Vulcanizing apparatus comprising a heating chamber having an open end, a member in the chamber movable toward and from the open end thereof, a detachable closure member for closing the open end of the chamber, a series of molds connected to said movable member, said molds being hinged together and each formed of hinged sections, and means for supporting said molds outside said chamber.

15. Vulcanizing apparatus comprising a vertical heating chamber adapted to receive a pack of sectional molds, a detachable closure member for the chamber, a mold supporting member movable vertically in the chamber and through the top thereof when said closure member is detached, and means above the top of the chamber for releasably engaging and supporting molds in a pack above the top of said chamber and in alignment therewith, there being sufficient space between the top of the chamber and the supporting means to permit opening and closing of a mold positioned between the chamber and supporting means.

16. Vulcanizing apparatus comprising a vertical heating chamber adapted to receive a pack of sectional molds, a detachable closure member for the chamber, a mold supporting member movable vertically in the chamber and through the top thereof when said closure member is detached, a magazine above the chamber in alignment therewith, said magazine having a side opening to permit access to the molds, and means in the magazine above the opening for releasably engaging molds and for supporting the same in alignment with the chamber.

17. Vulcanizing apparatus comprising a vertical heating chamber adapted to receive a pile of sectional molds, a detachable closure member for the top of the chamber, means spaced above the top of the chamber for releasably engaging and supporting any number of the molds in a pile above the chamber and in vertical alignment therewith, means for successively transferring molds from the chamber to said supporting means and for opening the molds between the chamber and said supporting means.

18. Vulcanizing apparatus comprising a plurality of mold units each including a pair of hinged mold sections, hinge connections between the mold sections of one unit and the adjacent mold section of the adjacent units, said hinge connections being disposed on the same side of all of the mold units, means for closing the mold units under considerable pressure, and means for heating the mold units.

19. Vulcanizing apparatus comprising a plurality of mold units each including a pair of hinged mold sections, hinge connections between the mold sections of one unit and the adjacent mold sections of the adjacent units whereby each mold section is hinged to the mold section of its unit at the other side thereof, said hinge connections between the mold units being disposed on the same side of the assembly of mold units, a fluid pressure operated ram, a hinge connection between the ram and the adjacent mold section, an abutment adapted to withstand the pressure of the fluid ram, a hinge connection between the abutment and the adjacent mold section, and means for heating the mold units.

20. The method of operating a series of vertically stacked molds that consists in supporting a portion of the stack, opening a mold underlying the supported portion for charging or discharging molded articles therefrom, and reforming the complete stack.

21. A vulcanizing heater comprising a series of mold members hingedly connected to one another to fold into a pack and relatively movable supports connected to the endmost mold members for opening the same and for imposing molding pressures on the pack of mold members.

22. A vulcanizing heater comprising a series of mold members hingedly connected to one another to fold into a pack, means for heating the molds and relatively movable supports connected to the endmost mold members for opening the mold members and for imposing molding pressures on the pack of mold members.

23. A vulcanizing heater comprising a series of mold members hingedly connected to one another to fold into a pack, relatively movable members connected to the undermost mold members, means for shifting said movable members apart to open said molds and means operable in a reverse direction for closing said molds and for applying molding pressure to the pack.

In testimony whereof I affix my signature.

HAROLD A. DENMIRE.